(12) United States Patent
Jin et al.

(10) Patent No.: US 7,705,309 B1
(45) Date of Patent: Apr. 27, 2010

(54) RADIATION DETECTOR WITH EXTENDED DYNAMIC RANGE

(75) Inventors: Guanghai Jin, Boxborough, MA (US); Lei Zhang, Acton, MA (US); Jing Zhao, Winchester, MA (US)

(73) Assignee: Agiltron Corporation, Woburn, MA (US)

( * ) Notice: Subject to any disclaimer, the term of this patent is extended or adjusted under 35 U.S.C. 154(b) by 0 days.

(21) Appl. No.: 12/082,007

(22) Filed: Apr. 8, 2008

Related U.S. Application Data

(63) Continuation-in-part of application No. 11/711,275, filed on Feb. 27, 2007.

(51) Int. Cl.
*H01L 25/00* (2006.01)

(52) U.S. Cl. .............. 250/338.1; 250/332; 250/352; 250/330; 250/370.08; 250/370.01

(58) Field of Classification Search ............... 250/338.1, 250/370.01, 370.08, 330, 332, 352
See application file for complete search history.

(56) References Cited

U.S. PATENT DOCUMENTS

| 5,300,915 | A * | 4/1994 | Higashi et al. ............ 338/22 R |
| 6,080,988 | A * | 6/2000 | Ishizuya et al. ........... 250/338.1 |
| 6,339,219 | B1 * | 1/2002 | Ishizuya et al. ............ 250/330 |
| 2003/0202233 | A1 * | 10/2003 | Sandstrom ................ 359/290 |
| 2004/0186382 | A1 * | 9/2004 | Modell et al. .............. 600/473 |
| 2007/0139757 | A1 * | 6/2007 | Lock ....................... 359/290 |

\* cited by examiner

*Primary Examiner*—David P Porta
*Assistant Examiner*—Djura Malevic
(74) *Attorney, Agent, or Firm*—Joseph Stecewycz

(57) ABSTRACT

A mechanical-optical transducer comprises a readout illumination source providing light having different wavelengths or different polarization states; an image sensor array for sensing the light from the readout illumination source; and a mechanical-optical device including sensing pixels whose optical property change in response to incident thermal infrared radiation, the mechanical-optical device having a reflective surface disposed to selectively reflect light from the readout illumination source to the image sensor array.

20 Claims, 9 Drawing Sheets

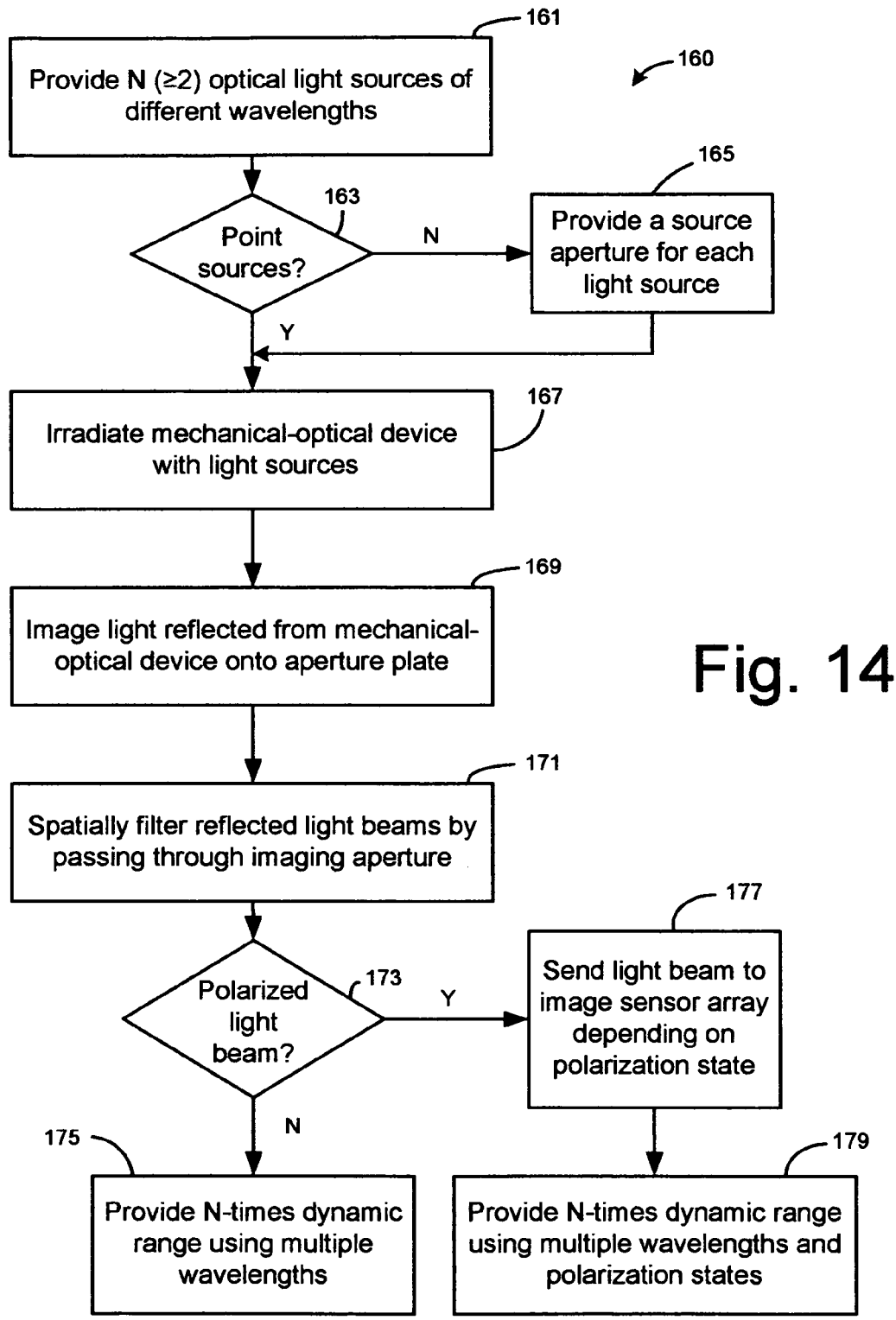

RADIATION DETECTOR WITH EXTENDED DYNAMIC RANGE

CROSS-REFERENCE TO RELATED APPLICATION

The present application is a continuation-in-part of patent application Ser. No. 11/711,275 entitled "Thermal displacement-based radiation detector of high sensitivity," filed 27 Feb. 2007.

BACKGROUND OF THE INVENTION

1. Field of Invention

The present invention relates to arrays of micro mirrors structured by MEMS (micro electrical mechanical systems) and, in particular, to radiation detection devices using optical readout of micro mirror orientations.

2. Description of the Background Art

In recent years, MEMS devices micromachined from silicon by electronics-industry techniques, have become important as transducers of various kinds. MEMS devices may be structured individually or in arrays. When a physical effect causes a microscopic deflection of a MEMS structure having a micro mirror, it is advantageous to detect the deflection with a reflected light beam. One well known example is the atomic force microscope, whereby the position of a single microscopic probe tip is sensed optically by reflecting a laser beam from the probe. In another example, a rectangular array of a plurality of MEMS micro mirrors may have individual deflections which relate to the variations in, temperature across the MEMS array. The deflections of all the individual micro mirrors can be read out as an image by a broad light beam. In all such cases, the ultimate sensitivity and dynamic range of an instrument whose transduction mechanism is the optical readout of an array of MEMS micro mirrors is at issue.

The prior state of the art discloses a plurality of thermal detector systems based on optical MEMS, or a mechanical-optical transducer, that include micro-mirror arrays. For example, U.S. Pat. No. 6,339,219 "Radiation imaging device and radiation detector," discloses an imaging device comprising a substrate transmissive to infrared radiation, an infrared lens system, a conversion unit for converting infrared radiation into displacements, and a readout optical system. Similar devices are disclosed in U.S. Pat. No. 6,469,301, "Radiation detectors including thermal-type displaceable element with increased responsiveness," and U.S. Pat. No. 6,835,932 "Thermal displacement element and radiation detector using the element."

FIG. 1 shows a conventional imaging device 10 comprising a visible-wavelength imager, such as charge coupled device (CCD) 11, to read-out the converted image, and a visible light source 13 to provide readout light. A first lens system 15 is used to guide readout light from the visible light source 13 to an array of micro mirrors 17 of a MEMS device 19. A ray flux limiting part 21 is used to selectively pass only desired ray fluxes transmitted in a portion of readout light reflected by the plurality of pixels after passing through the first lens system 15 and an aperture 23. A second lens system 25 forms positions conjugate with the plurality of reflection parts in conjunction with the first lens system 15. The photosensitive surface of the CCD 11 is placed at the conjugate positions.

In operation, the surface of the MEMS device 19 provides a uniform reflection when there is no physical disturbance to any of the micro mirrors 17. In certain applications, such as infrared imaging, an objective lens 29 is provided to project an infrared image onto the MEMS device 19. When such infrared radiation is incident, each corresponding micro mirror 17 may tilt and deflect readout light away from the aperture 23, thus modulating light transmitted to the CCD 11 in proportion to the incoming infrared radiation level. This design effectively converts infrared induced micro bending of the micro mirrors into intensity change at a visible read-out illumination. The optical readout from the CCD 11 typically tracks deflections of all micro mirrors 17 in the MEMS device 19 and provides an intensity map as an output.

Certain applications, such as imaging systems, could benefit from an imaging device having dynamic temperature ranges larger than that achievable using the prior art designs described above. It is appreciated that, as the device responsiveness increases, the corresponding readout dynamic range is proportionately reduced. This can be qualitatively described by Equation 1, where the temperature dynamic range $(\delta T_t)_{max}$ is inversely proportional to the responsivity of the sensing device:

$$(\delta T_t)_{max} = 100\%/\text{Responsivity} \quad (1)$$

What is needed is a mechanical-optical transducer that provides for a greater dynamic range than imaging devices in the prior state of the art, but where the sensitivity of the mechanical-optical transducer is not correspondingly decreased.

SUMMARY OF THE INVENTION

An advanced optical arrangement is disclosed to enable read out of the movements of an array of micro mirrors with improved dynamic range. The utility of this method may be applied to any array of micro mirrors whose movements and positions transduce some desired information. The present invention is related to a mechanical-optical transducer that has larger dynamic temperature sensing range than conventional devices, such as optical read-out thermal imagers. The conventional dynamic range is increased by using an optical wavelength multiplexing technique. Optical multiplexing is generally unique to optical systems, in which the dynamic range is multiply-increased by means of using multiple read-out light sources that are distinguishable in the read-out section. The method for such distinguishable means include use of light beams of different wavelengths, different modulations, and different polarizations. Exemplary embodiments of the present invention include the following implementations.

In one implementation of the present invention, a mechanical-optical transducer comprises: a readout illumination source; an image sensor array for responding to light from the readout illumination source; and a mechanical-optical device including a reflective surface disposed to selectively reflect light from the readout illumination source to the image sensor array.

In another aspect of the present invention, a mechanical-optical transducer comprises: a readout illumination source providing illumination in at least two polarization states; at least one image sensor array for sensing light from the illumination source; and a mechanical-optical device including a reflective surface disposed to selectively reflect light from the readout illumination source to at least one image sensor array.

In yet another aspect of the present invention, a method of detecting deflections in a mechanical-optical transducer comprises the steps of: irradiating a reflective surface of a mechanical-optical device with at least two light sources; selectively modifying the reflective surface in response to incident thermal infrared radiation; and reflecting light from the modified reflective surface to at least one image sensor array.

In still another aspect of the present invention, a thermal camera comprises: an objective lens for receiving thermal infrared radiation; a first light source of a first wavelength; a second light source of a second wavelength; an image sensor array for responding to the first light source and to the second light source; and an array of micro mirrors responsive to the thermal infrared radiation, the array providing a reflective surface disposed to selectively reflect light to the image sensor array from the first light source and from the second light source.

These and other features, aspects, and advantages of the present invention will become better understood with reference to the following drawings, description and claims.

DETAILED DESCRIPTION OF THE INVENTION

Figure 1:
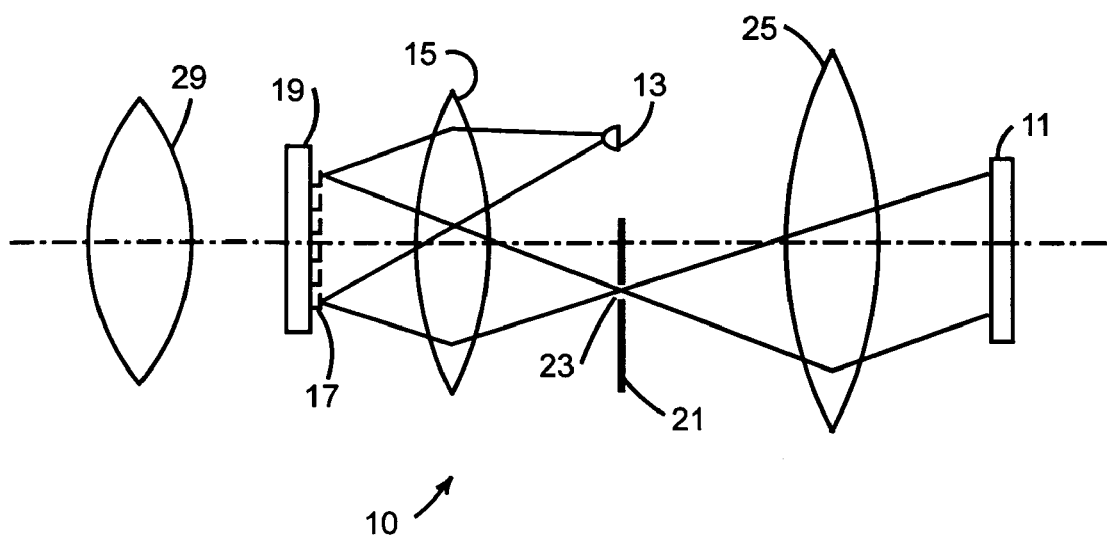
FIG. 1 is a diagrammatical illustration of a conventional radiation detector having an infrared radiation sensing micromirror array and a laser diode used as a readout supply unit, in accordance with the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims. In an exemplary embodiment, the disclosed device and method are applicable to the use of an array of micro mirrors in a thermal imaging camera.

The present invention is related to a mechanical-optical transducer readout device that can provide a larger dynamic response than that of conventional MEMS devices. This performance feature is highly desirable in, for example, radiation detection or thermograph applications such as fire fighting. In radiation detectors used for fire fighting applications, there is a need for a dynamic range that may exceed 400 C.°. In a conventional detection system, such a range may be obtainable, but only if detection sensitivity is correspondingly reduced. The disclosed mechanical-optical device can be utilized in a detector to provide an extended detection temperature range for meeting a broad range of application requirements, without incurring a corresponding reduction in detection sensitivity.

A primary function of the disclosed apparatus, that is, to image infrared radiation emitted by warm objects, can be adapted to a thermal camera. The transducer mechanism comprises an array of mechanical-optical structures bearing micro mirrors. The positions of the micro mirrors are read out by use of a visible-to-near-IR illumination system. This configuration functions to convert small temperature differences produced by incident thermal infrared radiation into displacements of the micro mirror array, and accordingly to a visible image which may be captured by an optical light imaging array. As described below, this function is enhanced by using different wavelengths of illumination to improve the accuracy and dynamic range of measuring the micro mirror displacements and, hence, the response of the associated thermal camera.

In accordance with the present invention, the limitation presented by Equation 1, above, can be circumvented by adapting an optical multiplexing technique to advantageously utilize separate readout light beams for the read-out function, and to thus multiply increase the dynamic range of the mechanical-optical transducer. To best utilize a configuration having separate readout light beams, the micro optical devices in the mechanical-optical transducer preferably comprise thermal mechanical support structures having relatively large bending ranges. Mechanical support structures which provide such large bending ranges in response to received thermal radiation are described in the commonly-assigned parent patent application Ser. No. 11/711,275, the disclosure of which is incorporated herein in entirety by reference. Accordingly, the large dynamic detection ranges of the present invention can be realized with separate readout light beams used with micro mirror support structures having large bending ranges.

Figure 2:
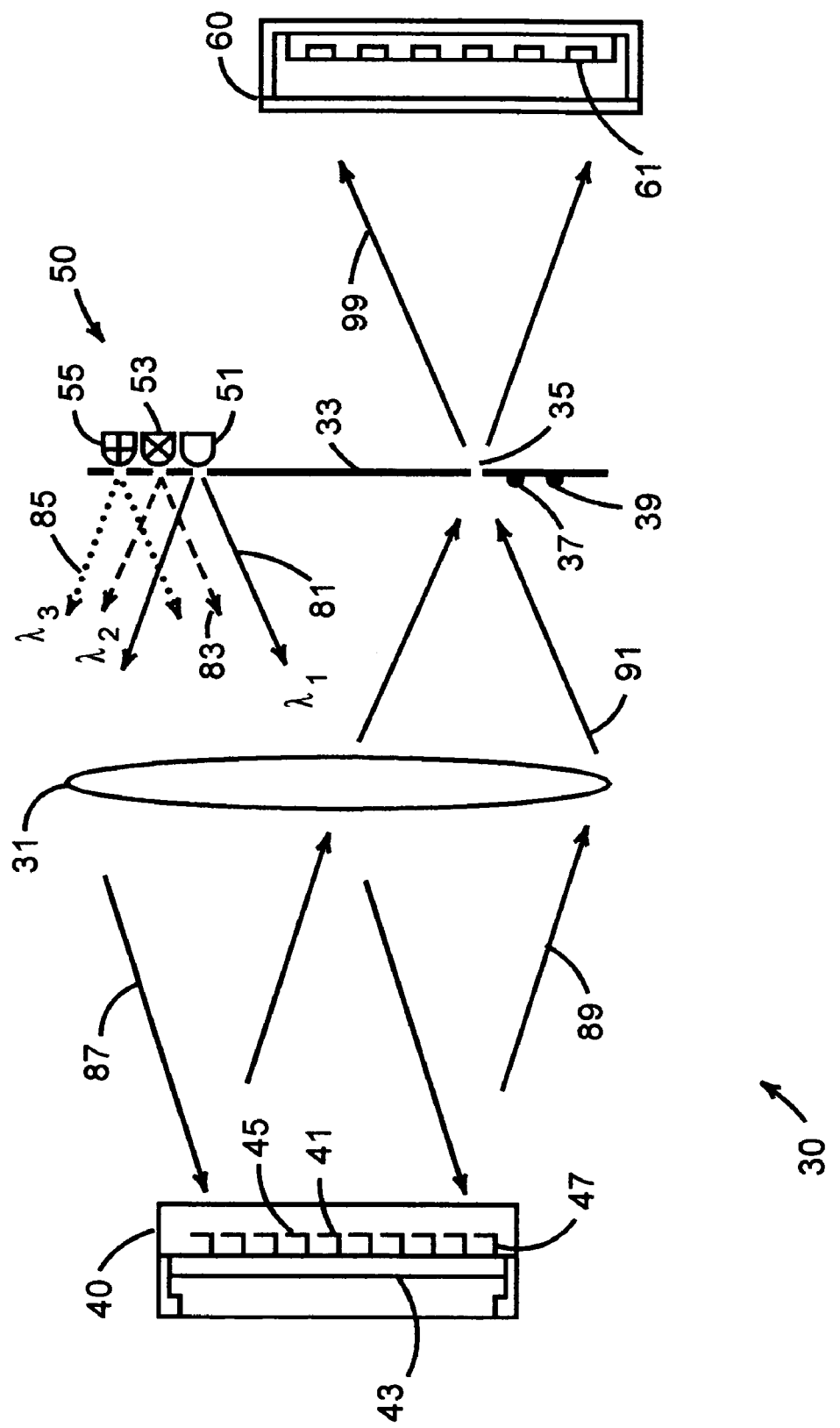
FIG. 2 is a diagrammatical illustration of an exemplary embodiment of a mechanical-optical transducer comprising readout illumination with multiple light sources, a mechanical-optical device, an aperture plate, and an image sensor array, in accordance with the present invention.

There is shown in FIG. 2 a simplified diagrammatical illustration of an exemplary embodiment of a mechanical-optical transducer 30, in accordance with the present invention. The mechanical-optical transducer 30 comprises a mechanical-optical device 40, an imaging lens 31, an aperture plate 33 with an imaging aperture 35, and an image sensor array 60. The mechanical-optical transducer 30 further comprises a multi-wavelength readout illumination source 50 to illuminate the mechanical-optical device 40, as explained in greater detail below.

Figure 3:
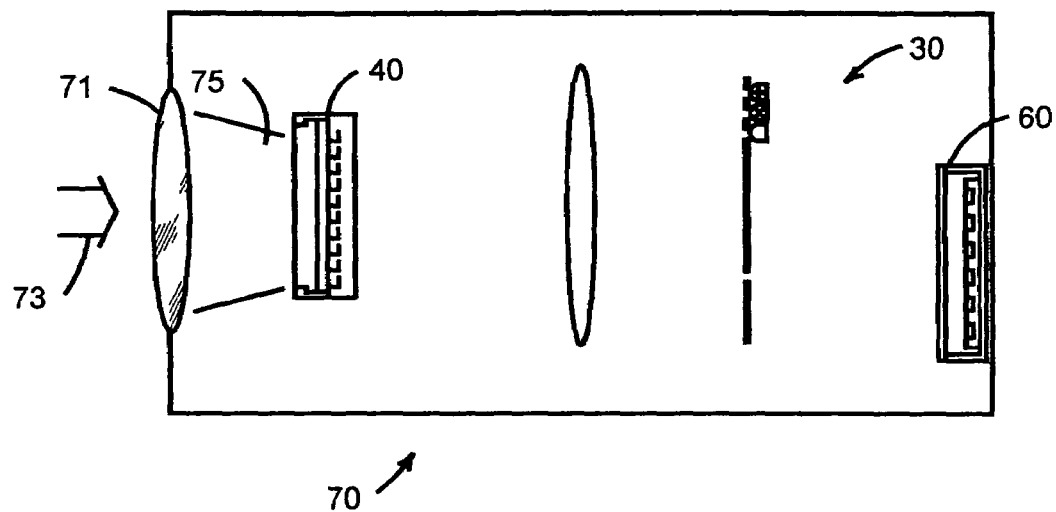
FIG. 3 is a diagrammatical illustration of thermal camera comprising an objective lens and the mechanical-optical transducer of FIG. 2.

The mechanical-optical transducer 30 may be used with an objective lens 71 in a radiation detector, such as a thermal camera 70 shown in FIG. 3. The thermal camera 70 may be used for detecting an incoming stimulus, a spatial pattern distribution, an image, or a uniform distribution, here represented by incident thermal infrared radiation 73. In an exemplary embodiment, the thermal infrared radiation 73 lies in an invisible radiation band, such as near-infrared, having a wavelength of approximately 3-5 µm, to long-wave infrared radiation having a wavelength of approximately 8-12 µm.

The objective lens 31 acquires the thermal infrared radiation 73 and projects converging rays 75 onto the mechanical-optical device 40 as a corresponding objective image or an infrared profile. When the thermal infrared radiation 73 is present, the image sensor array 60 may provide a corresponding output image in a viewing spectral band, such as visible light of approximately 0.4 to 1.0 µm. The objective lens 71 may comprise an infrared lens for use with near-infrared to long-wave infrared radiation, but it can be appreciated by one skilled in the art that the mechanical-optical transducer 30 may be readily adapted for use with other incoming radiation wavelengths, such as terahertz wavelengths.

As shown in FIG. 2, the mechanical-optical device 40 may comprise a plurality of micro mirrors 41 on a substrate 43, the micro mirrors 41 preferably aggregated into a rectangular array to form a collective reflective surface 45. The reflective surface 45 responds to an incoming stimulus, such as the thermal infrared radiation 73, and outputs a visible image via the image sensor array 60 for viewing by a user of the mechanical-optical transducer 30, as explained in greater detail below.

In an exemplary embodiment, each micro mirror 41 is moveably supported by means of a thermally-deformable bimaterial cantilever beam 47, such as described in the commonly-assigned parent application "Thermal displacement-based radiation detector of high sensitivity" having Ser. No. 11/711,275. Accordingly, any of the micro mirrors 41 in the mechanical-optical device 40 can move in response to localized thermal effects produced by the thermal radiation projected onto the substrate 43. Such movement of the micro mirrors 41 comprises a motion of rotation or tilting from 'neutral' or 'rest' positions in the plane defined by the array of micro mirror 39 reflective surfaces to positions rotated or tilted out of the plane defined by the reflective surface 45. The reflective surface 45 is thus selectively modified in response to the incoming image or spatial pattern distribution of the thermal infrared radiation 73 or other stimulus.

The image sensor array 60 may comprise a plurality of semiconductor-based imaging pixels 61, such as charge-coupled devices (CCDs), photodiodes, or complementary metal-oxide semiconductor (CMOS) devices. The image sensor array 60 may output a visible image, for example, as imaging information or as an optical readout, to a signal processor or other data collection system (not shown), as well known in the relevant art. The geometry of the image sensor array 60 preferably conforms to the rectangular format of the mechanical-optical device 40, such that there is at least one imaging pixel 61 in the image sensor array 60 corresponding to each micro mirror 41 in the mechanical-optical device 40. In an exemplary embodiment, the imaging pixel 61 comprises four imaging sub-pixels are used to sense readout illumination reflected from one corresponding micro mirror 39, as explained in greater detail below.

The readout illumination source 50 illuminates the mechanical-optical device 40 such that reflected light or optical radiation can be used to indicate movement of one or more of the micro mirrors 41. The readout illumination source 50 may comprise 'N' light sources or optical radiation sources, where N≧2, but for clarity of illustration, only three light sources are shown in the illustration. In an exemplary embodiment, the readout illumination source 50 provides visible or near-infrared light having wavelengths of approximately 0.4 micron to 1.0 micron. The use of multiple light/ illumination sources for read-out can provide greater dynamic range without reducing sensitivity, in comparison to a conventional detector using a single illumination source for read-out, such as the device shown in FIG. 1.

Accordingly, the readout illumination source 50 includes a first light source 51 emitting a first illumination beam 81 at a first wavelength ($\lambda_1$), a second light source 53 emitting a second illumination beam 83 at a second wavelength ($\lambda_2$), and a third light source 55 emitting a third illumination beam 85 at a third wavelength ($\lambda_3$). In an exemplary embodiment, the first light source 51 may comprise a red light-emitting diode (LED), the second light source 53 may comprise a green LED, and the third light source may comprise a blue LED.

Figure 4:
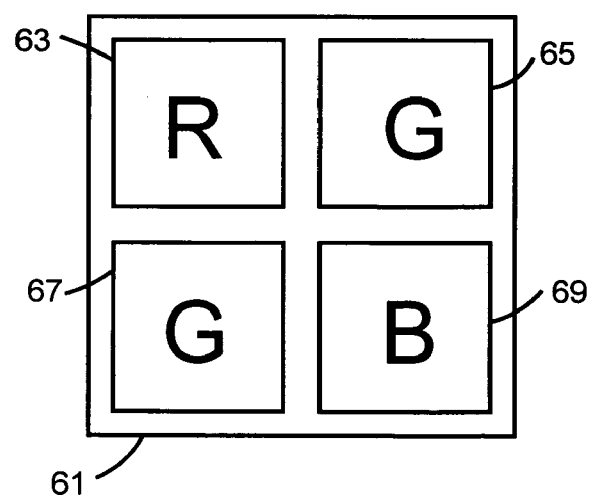
FIG. 4 is a simplified diagrammatical view of an imaging pixel comprising imaging sub-pixels, as can be used in the image sensor array of FIG. 2.

In an exemplary embodiment, shown in FIG. 4, each imaging pixel 61 may comprise: (i) a red-sensing sub-pixel 63 sensitive to the first illumination beam 81, (ii) green-sensing sub-pixels 65 and 67 sensitive to the second illumination beam 83, and (iii) a blue-sensing sub-pixel 69 sensitive to the third illumination beam 85. It should be understood that other imaging pixel geometries may be used with the present invention. For example, the imaging pixel 61 may comprise three or more imaging sub-pixels, and the shape of a particular imaging pixel may be different from the rectangular shape shown in the illustration.

In general, operation of the mechanical-optical transducer 30, in FIG. 2, may comprise the steps of: (i) projecting readout light from the readout illumination source 50 onto the micro mirrors 41; (ii) reflecting the incident readout light from the micro mirrors 41 to the image sensor array 60; and (iii) converting the resulting signal at the image sensor array 60 into a visible image. Under operating conditions in which the thermal infrared radiation 73 transmitted by the objective lens 71 is not incident on the mechanical-optical device 40, or is of low intensity, the mechanical-optical device 40 may provide a uniform baseline output, as described in greater detail below, to indicate that no infrared radiation or other stimulus is being detected. However, under operating conditions in which the thermal infrared radiation 73 irradiates the mechanical-optical device 40, the plurality of micro mirrors 41 reflect the readout light provided by the readout illumination source 50 so as to produce a visible output image by means of the image sensor array 60, where the visible image output corresponds to the spatial distribution of infrared radiation on the mechanical-optical device 40.

In the exemplary embodiment provided in the illustration, the first illumination beam 81 may be collimated by the imaging lens 31 into a first collimated beam 87 that illuminates the entire array of micro mirrors 41 in the mechanical-optical device 40. As explained above, when there is no thermal infrared radiation on the mechanical-optical device 40, each micro mirror 41 remains generally positioned in the plane defined by the reflective surface 45. That is, none of the thermally-deformable biomaterial cantilever beams 47 supporting respective micro mirrors 41 has tilted or rotated the attached micro mirror 41 from a neutral position.

Accordingly, substantially all of the first collimated beam 87 may be reflected from the micro mirrors 41 as a first reflected beam 89 and projected via the imaging lens 31 onto the aperture plate 33 as a first imaged beam 91. The aperture plate 33 is preferably disposed in an illumination transmission path, or optical path, defined by the transmittal of light, or illumination, from the micro mirrors 41 to the image sensor array 60. When all micro mirrors 41 are in neutral positions, little or none of the first imaged beam 91 passes through the imaging aperture 35. The imaging aperture 35 thus serves as a spatial filter configured to allow only a predetermined portion of the first imaged beam 91 to pass through to the image sensor array 60 as a first spatially-filtered beam 99 of the first wavelength when a predetermined level of the thermal infrared radiation 73 is incident on the mechanical-optical device 40. As explained in greater detail below, when one or more of the reflecting surfaces of the micro mirrors 41 tilt or rotate from neutral positions, a signal of the first wavelength $\lambda_i$ is transmitted to one or more respective imaging pixels 61 in the image sensor array 60.

The second illumination beam 83 and the third illumination beam 85 generally follow illumination transmission paths similar to the path defined by the first collimated beam 87, the first reflected beam 89, and the first imaged beam 91. Similarly, the imaging aperture 35 serves as a spatial filter to allow only a predetermined portion of the second wavelength illumination and third wavelength illumination to pass through to the image sensor array 60 when a predetermined level of the thermal infrared radiation 73 is incident on the mechanical-optical device 40. In particular, when the micro mirrors 41 are positioned in the plane defined by the reflective surface 45, the second illumination beam 83 may terminate at a termination point 37 on the aperture plate 33 after passing through the imaging lens 31, and the third illumination beam 85 may terminate at a termination point 39 on the aperture plate 33 after passing through the imaging lens 31. This occurs because the second illumination beam 83 and the third illumination beam 85 originate at different points than the first illumination beam 81, relative to the aperture plate 33. Accordingly, essentially no signal of the second wavelength ($\lambda_2$), nor of the third wavelength ($\lambda_3$), is transmitted to the image sensor array 60 when the reflecting surfaces of the micro mirrors 41 lie in neutral positions in a common plane.

Figure 5:
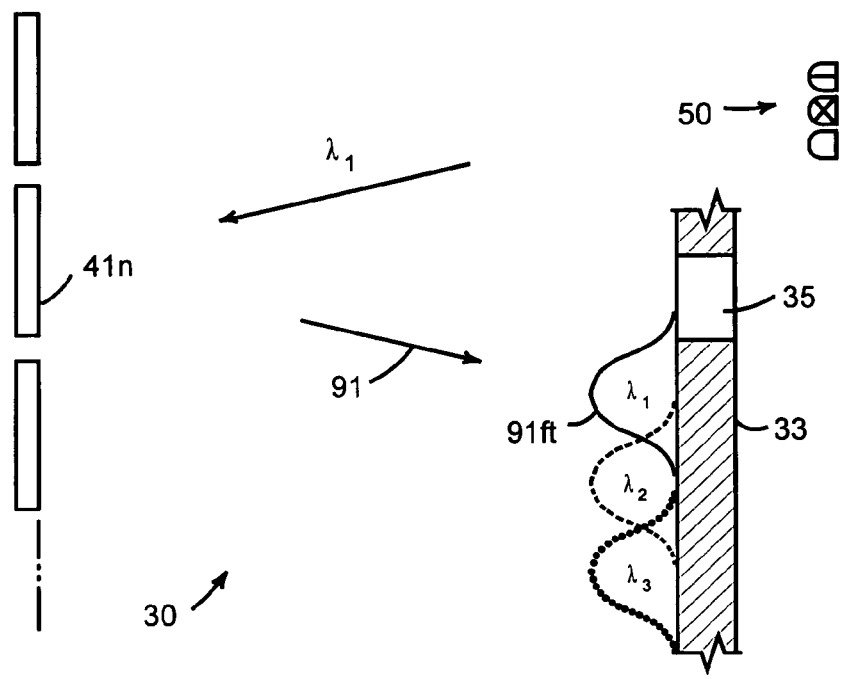
FIG. 5 is a simplified diagrammatical illustration of a readout beam reflecting from a micro mirror in the mechanical-optical device of FIG. 2.

A more detailed description of the operation of the mechanical-optical transducer 30 can be provided with reference to the simplified partial diagrammatical illustrations of FIGS. 5-8. As best seen in FIG. 5, the relative geometry of the readout illumination source 50, an "n-th" micro-mirror 41n, and the imaging aperture 35 is such that little or none of the readout signal illuminates the image sensor array 60 when a reflecting surface of the micro mirror 41n has not rotated or tilted out of the plane defined by the micro mirror reflective surfaces. A first waveform 91ft represents the schematic of the first imaged beam 91 distribution in the Fourier transform plane at the imaging aperture 35. The imaging lens 31 and the image sensor array 60 are not shown in the diagram, for clarity of illustration, and it should be understood that simplified illumination transmission paths are provided for descriptive purposes only and are not otherwise representative of the actual transmission paths for illumination originating at the readout illumination source 50. Moreover, the readout illumination source 50 may be operated intermittently, or may be constantly powered to provide for a continuous image reflected from the micro mirrors 41. Accordingly, a corresponding readout or sampling of an output image may be determined by an operator of the mechanical-optical transducer 30.

Figure 6:
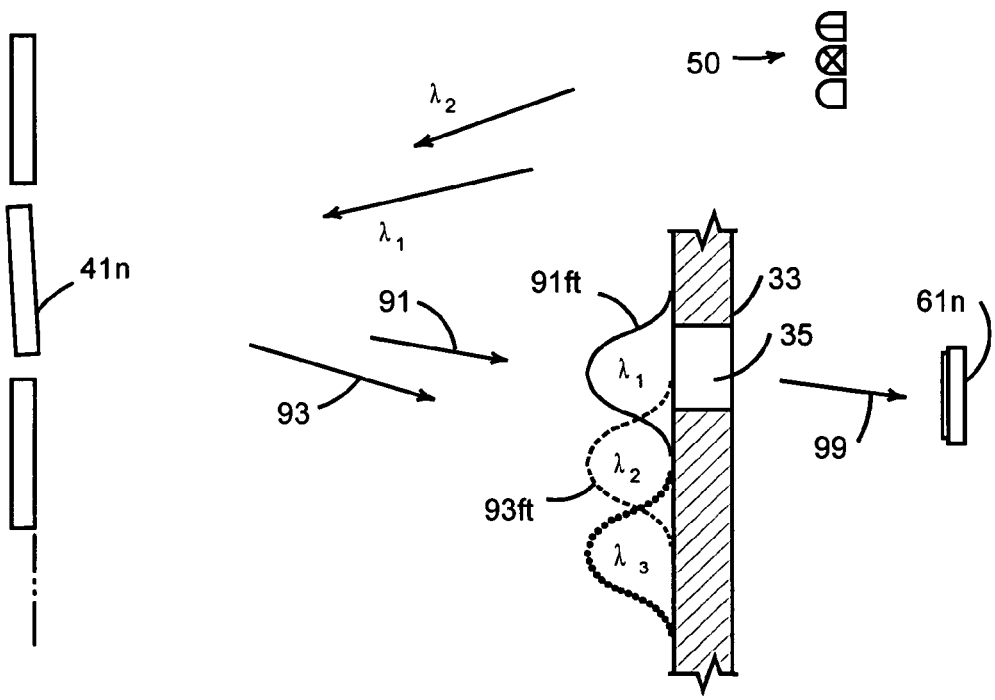
FIG. 6 is a view in which the micro mirror of FIG. 5 is tilted at a first angle.

FIG. 6 illustrates a mode of operation in which a portion of the readout signal illuminates the image sensor array 60. That is, a portion of the first imaged beam 91 passes through the aperture 35 because the micro mirror 41n has rotated and reflects the spatially-filtered beam 99 onto an imaging pixel 61n. When an incoming stimulus or infrared signal is initially incident upon the mechanical-optical transducer 30, one or more of the corresponding micro mirrors 41 may tilt or rotate out of the plane of the mechanical-optical device 40, as exemplified by the micro mirror 41n shown disposed at a first angle of rotation, in FIG. 6. In this mode of operation, the tilted micro mirror 41n may reflect a larger amount of the first imaged beam 91 through the aperture 35, in comparison to the operating condition of FIG. 5.

Figure 7:
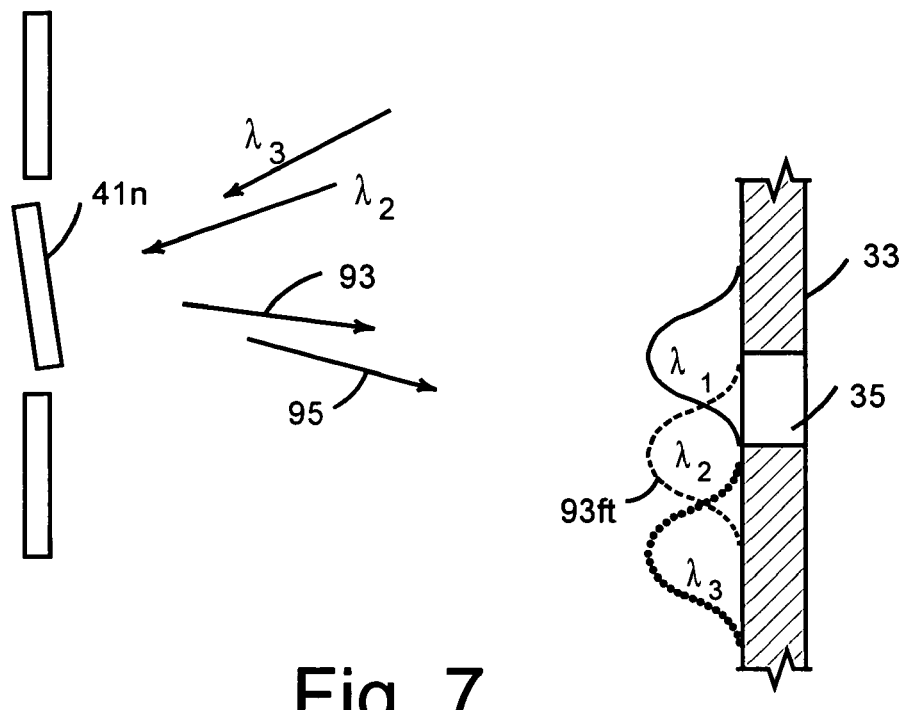
FIG. 7 is a view in which the micro mirror of FIG. 5 is tilted at a second angle.

As the intensity of the thermal infrared radiation 73 increases, the micro mirror 41n may further tilt at a second, larger angle of rotation, as shown in FIG. 7. In this mode of operation, the tilted micro mirror 41n reflects both a portion of the first waveform 91ft and a portion of a second waveform 93ft through the imaging aperture 35. The waveform 93ft represents the schematic of the second imaged beam 93 distribution in the Fourier transform plane at the imaging aperture 35. Accordingly, the presence of a second wavelength signal at the imaging pixel 61n may be used to indicate the presence of a relatively higher-level incoming infrared signal received at the corresponding micro mirror 41n, in comparison to the incoming infrared signal present in the example of FIG. 6.

Figure 8:
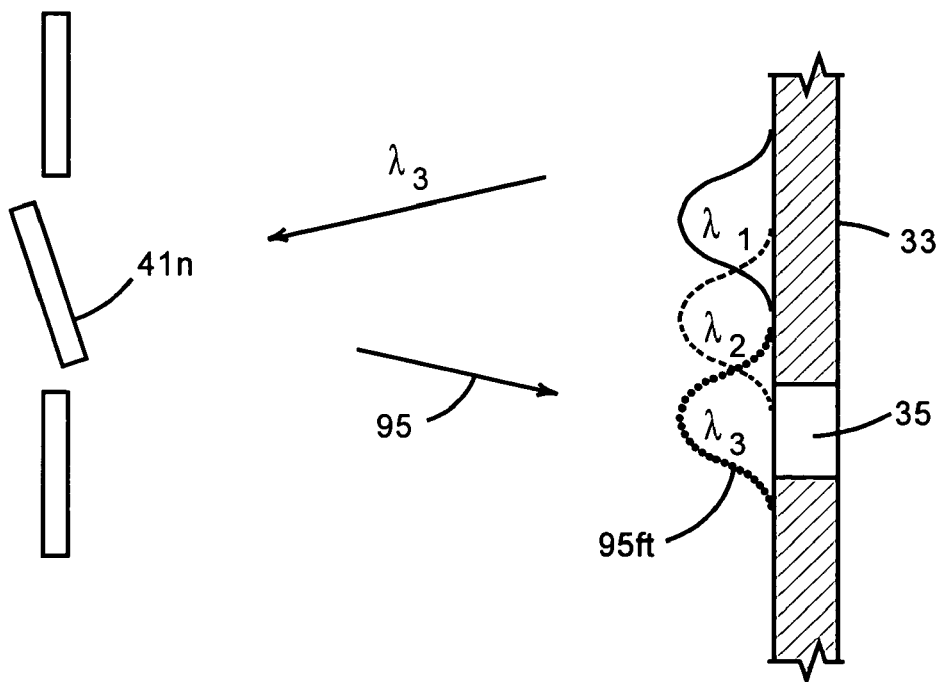
FIG. 8 is a view in which the micro mirror of FIG. 5 is tilted at a third angle.

As the intensity of the thermal infrared radiation 73 increases even further, the micro mirror 41n may tilt at a third, still larger angle of rotation, as shown in FIG. 8. In this mode of operation, the tilted micro mirror 41n reflects mostly the third waveform 95ft through the imaging aperture 35. The light beam 95 thus functions to provide additional dynamic range to the mechanical-optical transducer 30 for thermal infrared radiation 73 or for a stimulus which is beyond the read out range of light beams 91 and 93.

It can be appreciated by one skilled in the relevant art that, because the readout illumination source 50 comprises multiple light sources, different wavelengths of illumination can be transmitted to the image sensor array 60 when different levels of stimuli or incoming radiation are detected. Moreover, for 'N' light sources, the effective dynamic range of the mechanical-optical transducer 30 may be approximately N-times the dynamic range of the conventional imaging device 10 shown in FIG. 1.

It should be understood that the imaging aperture 35 also functions as a frequency filter in the Fourier plane. As appreciated by one skilled in the relevant art, a relatively small imaging aperture will filter out higher optical frequencies to provide greater detection sensitivity, but may not provide certain details in an output image. Conversely, a relatively large imaging aperture may allow higher frequencies to pass and provide for discrimination of details in the output image, but the radiation detector will exhibit less sensitivity. The present invention is thus not limited to the use of an imaging aperture of a particular size or shape.

Figure 9:
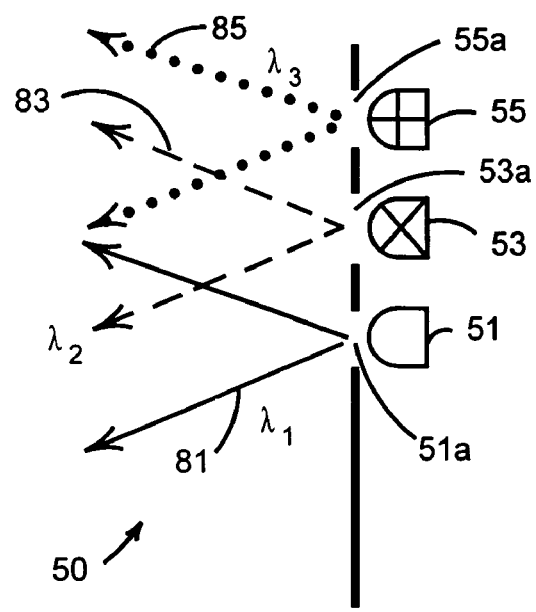
FIG. 9 is a simplified detail view of the multiple light sources of FIG. 2 showing readout beams disposed corresponding adjacent source in the aperture plate, in accordance with the present invention.

A more detailed view of the readout illumination source 50 is provided in FIG. 9. The first light source 51 is disposed proximate a first source aperture 51a in the aperture plate 33. The first source aperture 51a is configured and positioned in the transmission path of the first wavelength ($\lambda_1$) illumination such that the light source 51 appears as essentially a point source of illumination to the imaging lens 31. Similarly, the second light source 53 is disposed proximate a second source aperture 53a, and the third light source 55 is disposed proximate a third source aperture 55a, as shown in the diagram, so as to both appear as pinhole sources. In an exemplary embodiment, each of the source apertures 51a, 53a, and 55a comprise a pinhole approximately 0.3 mm in diameter. In the example provided, the first source aperture 51a, the second source aperture 53a, and the third source aperture 55a are spaced at approximately equal intervals.

Figure 10:
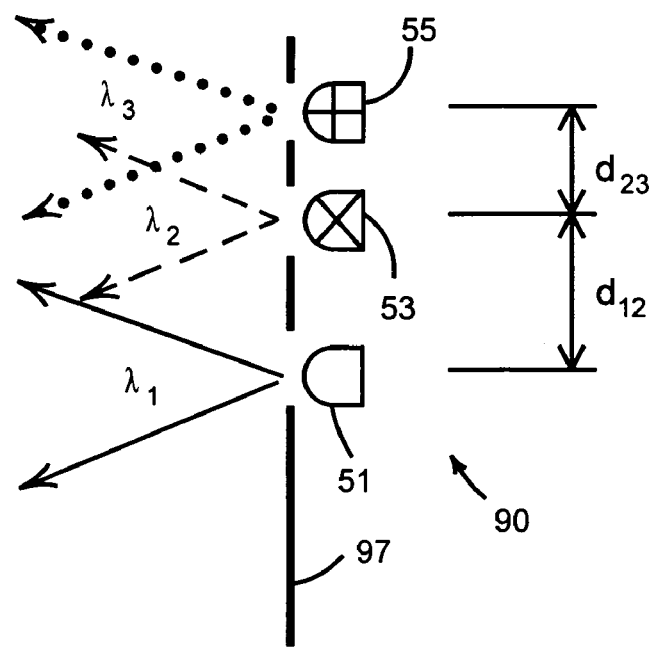
FIG. 10 is a simplified detail view of an alternate embodiment of multiple light sources in an illumination source.

Another exemplary embodiment of a readout illumination source 90 and an aperture plate 97 is provided in FIG. 10. The aperture plate 97 includes the first source aperture 51a, the second source aperture 53a, and the third source aperture 55a spaced apart at different intervals. That is, dimension "$d_{12}$" is greater than dimension "$d_{23}$." It can be appreciated by one skilled in the art that the configuration of FIG. 10 provides a non-linear response to the thermal infrared radiation 73 at the image sensor array 60. In comparison, the configuration of FIG. 9 provides an essentially linear response to the thermal infrared radiation 73 at the image sensor array 60.

The dimension "$d_{12}$" determines the relative spacing between the first waveform 91*ft* and the second waveform 93*ft*, and the dimension "$d_{23}$" determines the relative spacing between the second waveform 93*ft* and the third waveform 95*ft*, in FIG. 10. In an exemplary embodiment, the dimensions "$d_{12}$" and "$d_{23}$" are specified to provide an overlap between adjacent illumination waveforms such that the image sensor array 60 continuously receives a detectable illumination signal as the micro mirror 41*n* moves from the neutral position to a maximum angle of rotation.

For example, at any stage of operation, the micro mirror 41*n* continuously reflects to the image sensor array 60 a portion of either: (i) the first illumination beam 81, (ii) the first illumination beam 81 and the second illumination beam 83, (iii) the second illumination beam 83, (iv) the second illumination beam 83 and the third illumination beam 85, or (v) the third illumination beam 85. In general, for N illumination sources, the corresponding N adjacent waveforms are overlapped such that the image sensor array 60 continuously receives detectable readout signals when any of the micro mirrors 41 move between neutral positions and maximum rotation angles.

Figure 11:
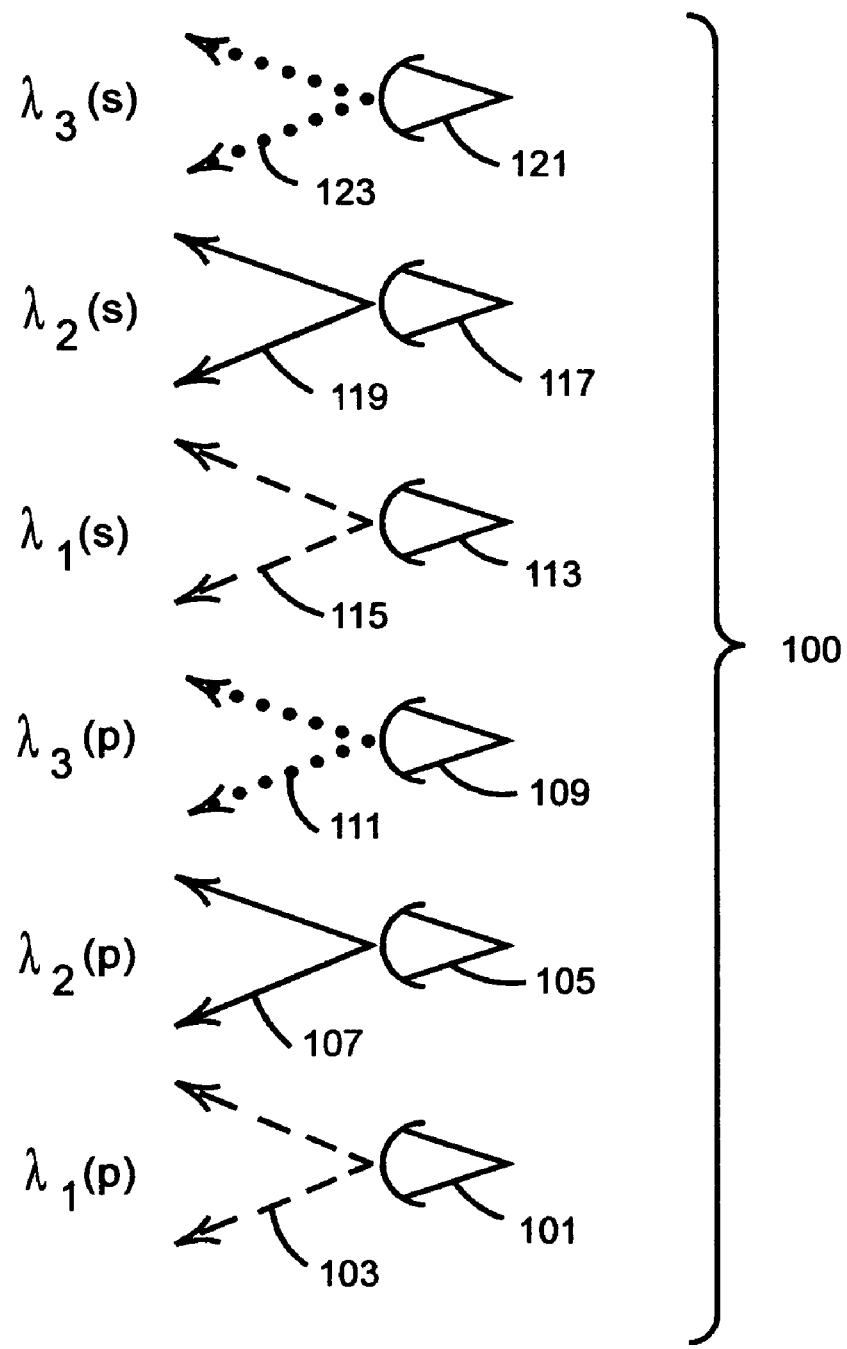
FIG. 11 is a simplified detail view of an alternate embodiment of the readout illumination source of FIG. 2 comprising multiple point sources of light, in accordance with the present invention.

Another exemplary embodiment of a readout illumination source 100 is provided in FIG. 11. The readout illumination source 100 comprises multiple point sources of optical radiation such as visible or near-infrared light. Accordingly, source apertures are not required with such point sources. In the example provided, the readout illumination source 100 comprises six point sources of light to provide a dynamic range, or alternatively a sensitivity, for the mechanical-optical transducer 30 approximately six times as great as a conventional radiation detector that uses only a single source of readout illumination. The six point sources of light may comprise point sources operating at up to six different wavelengths, as described in greater detail below.

A point source of light may be provided by, for example, an LED or laser output via a multimode optical fiber (not shown) having a numerical aperture (NA) of up to approximately 0.5. In an alternative exemplary embodiment, the point source of light may comprise an LED configured to operate in an end-fire mode as an illumination plate to provide an illumination source approximately 25 μm in size.

Alternatively, as embodied in the example of FIG. 11, the six point sources of light may comprise point sources operating at three different wavelengths, where three of the point sources are operating in a first polarization state, "p-polarized" for example, and three of the point sources are operating in a second polarization state, "s-polarized" for example. In the example provided, the readout illumination source 100 comprises a first light source 101 emitting a first p-polarized light beam 103 at a first wavelength ($\lambda_1$), a second light source 105 emitting a second p-polarized light beam 107 at a second wavelength ($\lambda_2$), and a third light source 109 emitting a third p-polarized light beam 111 at a third wavelength ($\lambda_3$). The readout illumination source 100 further comprises a fourth light source 113 emitting a first s-polarized light beam 115 at the first wavelength ($\lambda_1$), a fifth light source 117 emitting a second s-polarized light beam 119 at the second wavelength ($\lambda_2$), and a sixth light source 121 emitting a third s-polarized light beam 123 at the third wavelength ($\lambda_3$).

Figure 12:
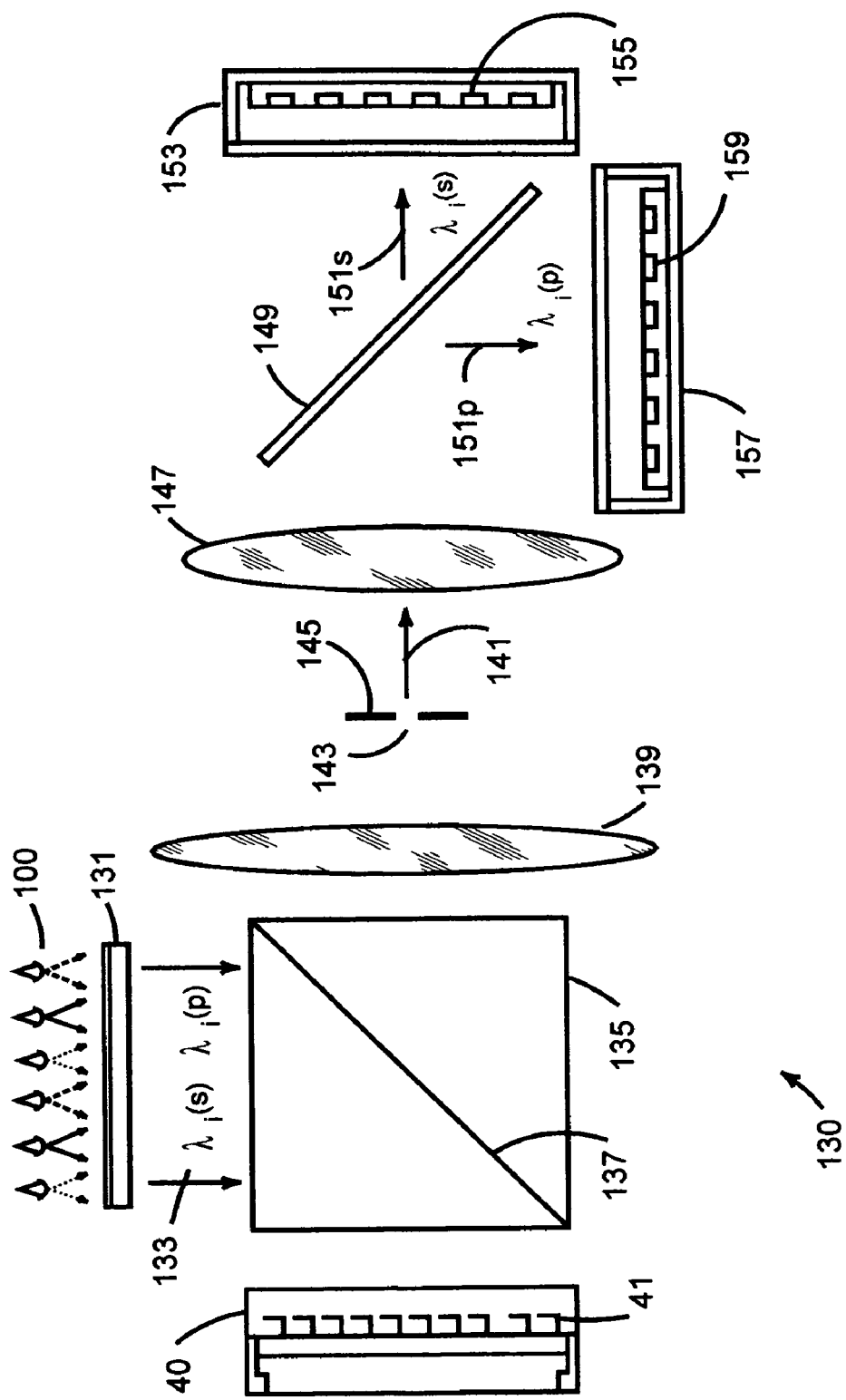
FIG. 12 is a diagrammatical illustration of an alternate embodiment of a mechanical-optical transducer comprising multiple light sources, a mechanical-optical device, a beam splitter, and two image sensor arrays, in accordance with the present invention.

The readout illumination source 100 may be utilized in a mechanical-optical transducer 130, shown in FIG. 12. In an exemplary embodiment, the light sources 101, 105, 109, 113, 117, and 121 may be configured as a linear array having either uniform spacing or variable spacing, as explained in greater detail above. Accordingly, the light beams 103, 107, 111, 115, 119, and 123 may be collimated by a rod lens 131 to produce a set of collimated light beams 133 inputted to a beam splitter 135. The set of collimated light beams 133 may be reflected at a beam splitter interface 137 to illuminate the micro mirrors 41 in the mechanical-optical device 40. A portion of the set of light radiation beams 133 is reflected from the micro mirrors 41 to pass through the beam splitter 135 and through an imaging lens 139 onto an imaging aperture 143 in an aperture plate 145. A portion of the set of light radiation beams 133 may pass through the imaging aperture 143 as spatially-filtered light 141 and is collimated by a collimating lens 147.

An s-polarized portion 151*s* of the collimated spatially-filtered light 141 is transmitted through a polarization splitter 149 to a first image sensor array 153, where the polarization splitter 149 is disposed in an optical path between the readout illumination source 100 and the first image sensor array 153. A p-polarized portion 151*p* of the collimated spatially-filtered light 141 is reflected from the polarization splitter 149 to a second image sensor array 157. In an exemplary embodiment, the image sensor arrays 153 and 157 comprise respective color CMOS imaging pixels 155 and 159 that can distinguish optical radiation of the wavelengths emitted by the readout illumination source 100, such as the first wavelength ($\lambda_1$), the second wavelength ($\lambda_2$), and the third wavelength ($\lambda_3$). Thus, by utilizing the array of six light sources having two different polarization states in the readout illumination source 100 with the two color CMOS image sensor arrays 153 and 157, the dynamic range of the mechanical-optical transducer 130 can be approximately six times the dynamic range of a conventional imaging device.

Figure 13:
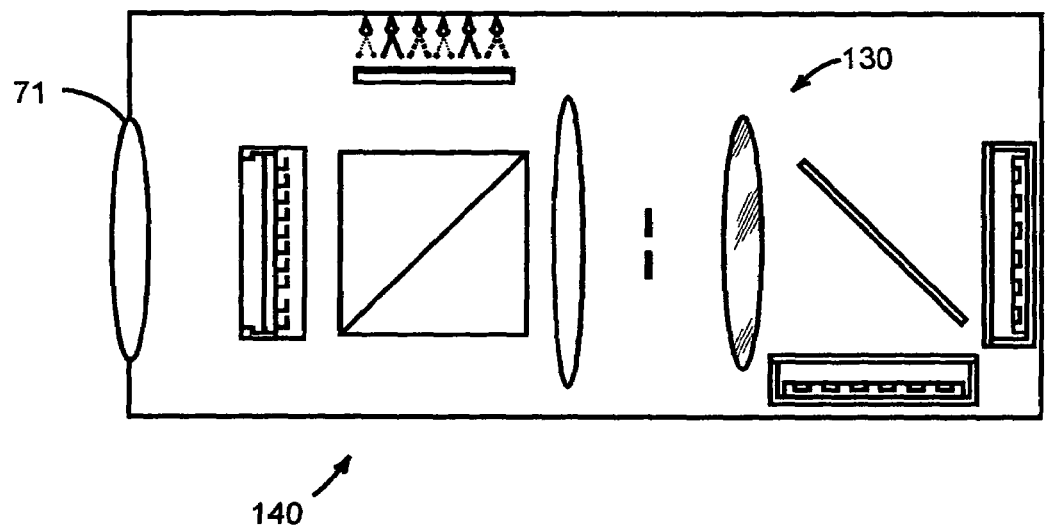
FIG. 13 is a flow diagram illustrating operation of the mechanical-optical transducer of FIGS. 2 and 12; and, FIG. 14 is a diagrammatical illustration of thermal camera comprising an objective lens and the mechanical-optical transducer of FIG. 11.

The mechanical-optical transducer 130 may be used with an objective lens 71 in a radiation detector, such as a thermal camera 140 shown in FIG. 13. The thermal camera 140 may be used for detecting the thermal infrared radiation 73. The objective lens 71 acquires the thermal infrared radiation 73 and projects converging rays 75 onto the mechanical-optical device 130 as a corresponding objective image or an infrared profile, and functions in a manner similar to that of thermal camera 70 shown in FIG. 3.

A method of extending the dynamic range of a mechanical-optical transducer by a factor of approximately N, in accordance with the present invention, may be described with reference to a flow diagram 160 of FIG. 14 in which a readout illumination source is provided comprising N optical light sources, such as the light sources 50 and 100 described above, at step 161, where N≧2. If the optical light sources are not point sources, at decision block 163, a source aperture may be provided to spatially modify each illumination source and provide a point source illumination beam, at step 165. A mechanical-optical device, such as a micro mirror array, is irradiated with light provided by the illumination source, at step 167.

The light may be reflected from the mechanical-optical device, at step 169, and projected onto an aperture plate, such as the aperture plates 33 and 145 described above. A portion of the light may be spatially filtered, at step 171, by passing through an imaging aperture, such as the imaging apertures 35 and 143 described above. If the illumination beams are not polarized, at decision block 173, the illumination beams are transmitted to an image sensor array, at step 175. The dynamic range of the radiation detector may thus be increased as a function of the number of wavelengths of illumination provided by the illumination source, as described above.

If one or more of the illumination beams are polarized, at decision block 173, a polarization splitter may be used to direct the light beams of specified polarization states to different image sensor arrays, at step 177. For example, p-polarized illumination may be transmitted to the first image sensor array 153, and s-polarized illumination may be transmitted to the second image sensor array 157, as described above. The dynamic range and the sensitivity of the radiation detector 130 may thereby be increased as a function of the different polarization states and the number of wavelengths of illumination provided by the illumination source, at step 179.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A mechanical-optical transducer comprising:
   a readout illumination source, said readout illumination source having a first light source providing light of a first wavelength and a second light source providing light of a second wavelength, said first light source spaced from said second light source by an interval;
   an image sensor array including a plurality of imaging pixels for responding to light from said readout illumination source;
   a mechanical-optical device including a plurality of micro mirrors forming a reflective surface disposed to selectively reflect light from said readout illumination source to corresponding said imaging pixels in said image sensor array, and
   an aperture plate disposed in an optical path between said mechanical-optical device and said image sensor array, said aperture plate having an imaging aperture for spatially filtering illumination from said readout illumination source such that either light of the first wavelength or light of both wavelengths is selectively provided to at least one of said imaging pixels.

2. The mechanical-optical transducer according to claim 1 wherein said readout illumination source further comprises a third light source providing light of a third wavelength, said third light source spaced from said second light source by a second interval.

3. The mechanical-optical transducer according to claim 1 further comprising an imaging lens for projecting illumination from said mechanical optical device onto said aperture plate.

4. The mechanical-optical transducer according to claim 1 wherein said readout illumination source comprises at least one of a light emitting diode and a laser.

5. The mechanical-optical transducer according to claim 1 further comprising a source aperture disposed between said readout illumination source and said mechanical-optical device.

6. A mechanical-optical transducer comprising:
   a readout illumination source having at least two light sources spaced apart by an interval, said at least two light sources providing light having at least two polarization states;
   at least one image sensor array including a plurality of imaging pixels;
   an imaging aperture for spatially filtering illumination from said readout illumination source such that either light of the first polarization state or light of the second polarization state is selectively provided to at least one said imaging pixel in said at least one image sensor array, and
   a mechanical-optical device including a reflective surface disposed to selectively reflect illumination from said readout illumination source to said at least one image sensor array.

7. The mechanical-optical transducer according to claim 6 wherein said first light source emits light having a first polarization state and said second light source emits light having a second polarization state.

8. The mechanical-optical transducer according to claim 7 further comprising a polarization splitter disposed to transmit said light having a first polarization state to said at least one image sensor array.

9. The mechanical-optical transducer according to claim 7 further comprising a polarization splitter disposed to reflect said light having a second polarization state to said at least one image sensor array.

10. The mechanical-optical transducer according to claim 6 further comprising a beam splitter disposed in an optical transmission path from said mechanical-optical device to said at least one image sensor array.

11. The mechanical-optical transducer according to claim 6 further comprising an wherein said imaging aperture is disposed in an optical path between said mechanical-optical device and said at least one image sensor array.

12. The mechanical-optical transducer according to claim 11 further comprising an imaging lens for imaging light reflected from said mechanical-optical device onto said imaging aperture.

13. The mechanical-optical transducer according to claim 11 further comprising a collimation lens for projecting light passing through said imaging aperture onto said at least one image sensor array.

14. A method of detecting deflections in a mechanical-optical transducer, said method comprising the steps of:
   irradiating a reflective surface of a mechanical-optical device with light sources having at least two different wavelengths, said light sources being spaced at an interval;
   selectively modifying said reflective surface in response to incident thermal infrared radiation;
   reflecting light from said reflective surface to at least one image sensor array having a plurality of imaging pixels, and
   spatially filtering at least a portion of said light reflected from said reflective surface such that either light of the first wavelength or light of both wavelengths is selectively provided to at least one said imaging pixel in said image sensor array.

15. The method according to claim 14 wherein at least one of said light sources emits a light beam having a polarization state.

16. The method according to claim 15 further comprising the step of providing a polarization splitter to reflect said light beam having a polarization state.

17. The method according to claim 14 wherein at least one of said light sources comprises a light emitting diode configured to operate in an end-fire mode.

18. A thermal camera comprising:
   an objective lens for receiving thermal infrared radiation;
   a first light source of a first wavelength;
   a second light source of a second wavelength, said second light source spaced from said first light source by an interval;

an image sensor array having a plurality of imaging pixels for responding to at least one of said first light source and said second light source;

an array of micro mirrors responsive to said thermal infrared radiation, said array providing a reflective surface disposed to selectively reflect light to said image sensor array from said first light source and from said second light source, and an imaging aperture for spatially filtering said first light source and said second light source such that either light of the first wavelength or light of both wavelengths is selectively provided to at least one of said imaging pixels.

19. The thermal camera according to claim 18 further comprising a polarization splitter for transmitting light of a first specified polarization state to said image sensor array and for reflecting light of a second specified polarization state to a second image sensor array.

20. The thermal camera according to claim 18 further comprising a beam splitter disposed to reflect light from said first light source to said array of micro mirrors and to allow transmission of light from said array of micro mirrors to said image sensor array.

* * * * *